United States Patent

Markel

[15] 3,637,080
[45] Jan. 25, 1972

[54] METHOD OF AND APPARATUS FOR SKIMMING FLOTSAM FROM THE SURFACE OF A BODY OF WATER

[72] Inventor: Arthur L. Markel, Miami, Fla.

[73] Assignee: Reynolds International, Inc., Richmond, Va.

[22] Filed: Oct. 9, 1970

[21] Appl. No.: 79,487

[52] U.S. Cl.................................210/83, 210/242, 210/526, 210/DIG. 21
[51] Int. Cl.........................................................E02b 15/04
[58] Field of Search..............210/83, 242, 525, 526, DIG. 21

[56] References Cited

UNITED STATES PATENTS 1,603,625  10/1926  Mitchell............................210/526 X
2,937,757  5/1960   Pisani................................210/526
3,539,048  11/1970  Pearson.............................210/242

*Primary Examiner*—Samih N. Zaharna
*Attorney*—Low & Matthews

[57] ABSTRACT

A method of and apparatus for skimming flotsam from the surface of a body of water. Floating material, such as oil, is directed toward and into pockets on a continuously driven conveyor belt means which serves to submerge the floating material beneath the surface of the water. A transfer of the material is made to a suitable conduit means from which the floating material is pumped to a suitable reservoir or station where it is separated from the water. When the skimmer is used to harvest plants or the like, a cutting means is placed in the entrance of the conduit to shred the plants.

15 Claims, 6 Drawing Figures

PATENTED JAN25 1972

INVENTOR.
Arthur L. Markel
BY
ATTORNEYS

PATENTED JAN 25 1972

INVENTOR.
Arthur L. Markel

BY

ATTORNEYS

METHOD OF AND APPARATUS FOR SKIMMING FLOTSAM FROM THE SURFACE OF A BODY OF WATER

This invention relates to a method of and apparatus for collecting flotsam from the surface of a body of water and more particularly to a method and apparatus for skimming flotsam, such as oil, and carrying it beneath the surface of the water after which it is separated from the water.

In skimming flotsam from the surface of the water it has been known to use conveyors, scoops, or paddle wheels to carry the flotsam out of the water to a reservoir. This practice has not always proved to be efficient in that much of the flotsam frequently escapes the conveyor or other collecting device.

Much of the difficulty experienced in the prior art devices has been caused by the lack of an adequate means for conveying the flotsam to the reservoir or separation station. Most of the prior art devices use fixed conveyors, scoops or paddles which do not go deeply enough into the water to skim flotsam adequately or to prevent lateral movement thereof. As a result the flotsam escapes beneath the conveyor or laterally from its sides.

These difficulties have been effectively overcome by the present invention wherein a skimming conveyor having a substantial inclination to the surface of the water directs the flotsam beneath the water while effectively trapping it in pockets which prevent the escape of any substantial quantity of the floating material. Thereafter, the flotsam is directed toward a suitable reservoir or separating apparatus.

In accordance with the present invention the angle of inclination of the skimming conveyor is adjustable so as to provide an optimum skimming angle for the incoming flotsam vis-a-vis the propulsion speed of a vessel on which the skimming apparatus is mounted.

A particular area of use for the present invention is in the field of oil recovery. In recent years there has been an increasing amount of floating oil polluting the waterways, leaving oil deposits on beaches and killing marine animals and plant life. Many attempts have been made to solve the problem of collecting this floating oil, either with chemical absorbents, straw, or skimming devices. While some success has been realized using these methods, there still remains an urgent need for a practical means for recovering floating oil which is efficient and simple to operate. This invention combines desirable features of a variable control means for adjusting the skimmer conveyor and a variable speed control means for synchronizing the speed of the skimmer conveyor with the speed of a watercraft, thereby offering both a practical and efficient means for recovering oil.

The present invention may also be used as a floating aquatic harvester. Thus water hyacinths, water lilies, and other floating aquatic leaves or plants may be gathered. When used in this manner, the skimmer apparatus also employs a suitable chopping or shredding device which is positioned between the conveyor and the pump.

The inherent advantages and improvements of the present invention will become more readily apparent upon considering the following detailed description of the invention and by reference to the drawings in which.

Figure 1:
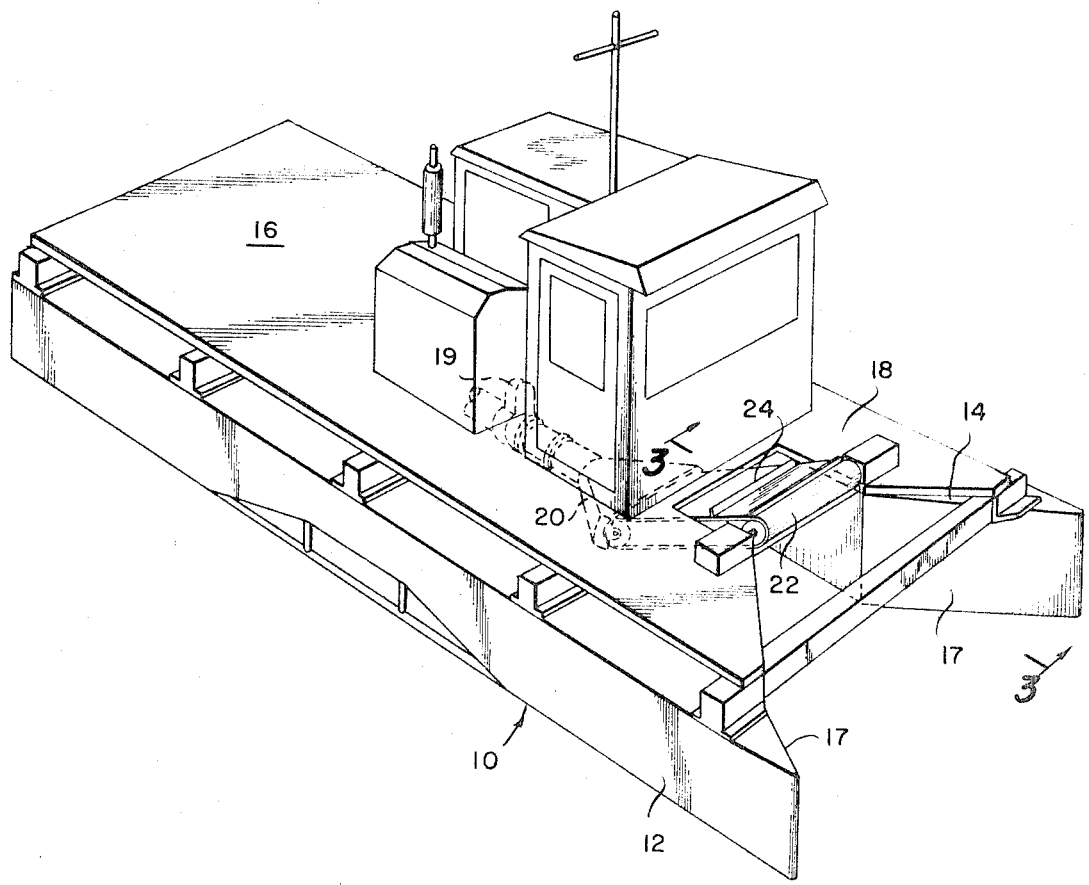
FIG. 1 is a perspective view illustrating a preferred embodiment of the present invention.

Referring now to FIG. 1, there is illustrated a preferred embodiment of the present invention shown mounted on a catamaran type vessel indicated generally at 10. The vessel 10 has two parallel hulls 12 and 14 bridged in conventional manner by a platform or deck structure 16. The bow sections of the hulls are each tapered at 17 to form a funnellike opening for directing flotsam, such as oil, toward and into a skimmer apparatus indicated generally at 18. After being carried beneath the surface of the water in a manner described hereinafter, the flotsam is transferred into a funnel 20 from where it is withdrawn by the vacuum of a pump 19. It is preferred to use an axial flow pump 19 such as is illustrated in my copending Pat. application Ser. No. 833,105, filed June 13, 1969, entitled Method of and Apparatus for Separating Fluids Having Different Densities.

Figure 3:
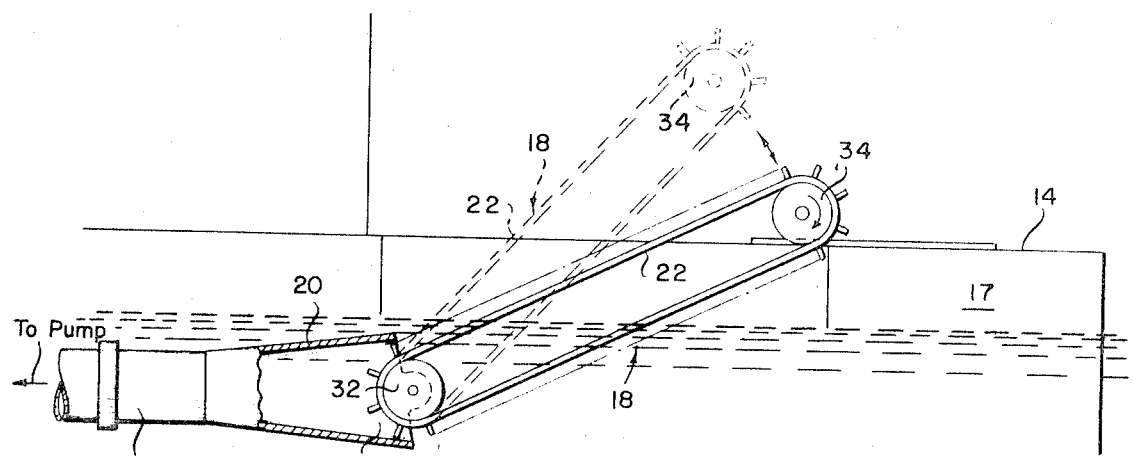
FIG. 3 is a side elevational view in vertical cross section taken along line 3—3 of FIG. 1.
Figure 4:
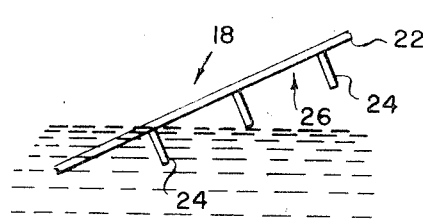
FIG. 4 is an enlarged, fragmentary elevational view showing a portion of the conveyor belt of FIG. 3.

Skimmer apparatus 18, as shown in FIG. 3, comprises a driven endless belt conveyor 22 which is shown partially submerged below the surface of the water. With conveyor 22 partially submerged and driven to force the water toward funnel 20, the flotsam is trapped under the surface of the water between the conveyor belt surface and hulls 12 and 14 where it can be readily collected, as will be explained in detail. Conveyor 22 is provided with transverse fins 24 which together with the oblique angle positioning of the conveyor itself cooperates to force the floating matter under the surface of the water. In order to accomplish this, pockets 26 are formed between adjacent fins 24 and the surface of conveyor 22 between the adjacent fins. Walls 28 and 30 of hulls 12 and 14, respectively, provide guide means or opposed ends for pockets 26 and prevent any substantial lateral escape of the flotsam entrapped in pockets 26 beneath the surface of the water. The fact that oil, debris, flowers, and other floating matter are lighter than water aids in the transport of the flotsam toward funnel 20 in that the buoyant force of the water serves to contain the floating matter in pockets 26. Thus an essentially closed chamber is formed for carrying flotsam to funnel 20.

FIG. 3 shows funnel 20 positioned beneath the surface of the water in a position to receive flotsam from endless conveyor 22. It is important that the funnel 20 engulf the submerged end of the conveyor to ensure that no floating matter escapes the skimmer and returns to the surface of the water. In order to achieve this function, funnel 20 is provided with a mouth which is slightly larger than the submerged end of conveyor 22 so that the conveyor fins 16 passing the funnel mouth are close enough to prevent any flotsam from escaping the suction of the pump.

The fins 16 can be of any desired height to form a desired volume for pocket 26 depending upon the particular matter to be collected, with an appropriate adjustment being made in the mouth of the funnel 20. For example, if the flotsam is oil, relatively short fins may be utilized since a film of floating oil on water is normally quite thin. Whereas, solid matter which accumulates into thick masses may require relatively long fins to ensure that all the matter is trapped in a pocket. It is also contemplated when harvesting aquatic plants, such as hyacinths, or tree leaves, that in place of the endless conveyor belt with fins, the conveyor belt could have a brushlike surface or a plurality of transverse rake tines or paddle wheels. In all instances, the skimmer is driven in a direction to force the flotsam under the surface of the water into funnel 20.

Figure 6:
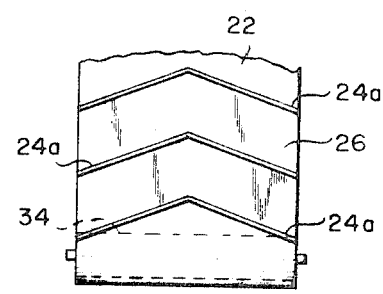

A further modification of the fin structure contemplated in the present invention is to employ nonlinear fins 24. Thus the fins may be V-shaped as shown at 24a in FIG. 6. Wave-shaped or other nonlinear fins may also be used.

Skimmer 18, as shown in FIG. 3, has a lower sprocket 32 mounted on a fixed rotating shaft, whereas an upper sprocket 34 is mounted on a shaft which is movable to increase or decrease the angle of inclination between the conveyor belt and the surface of the water. By having the upper end of the skimmer adjustable, varying amounts of flotsam may be conveyed by the skimmer, preventing overloading of the funnel or pump thereby making the skimming operation more efficient to run. The adjusting means may be either manual or motor operated.

Figure 2:
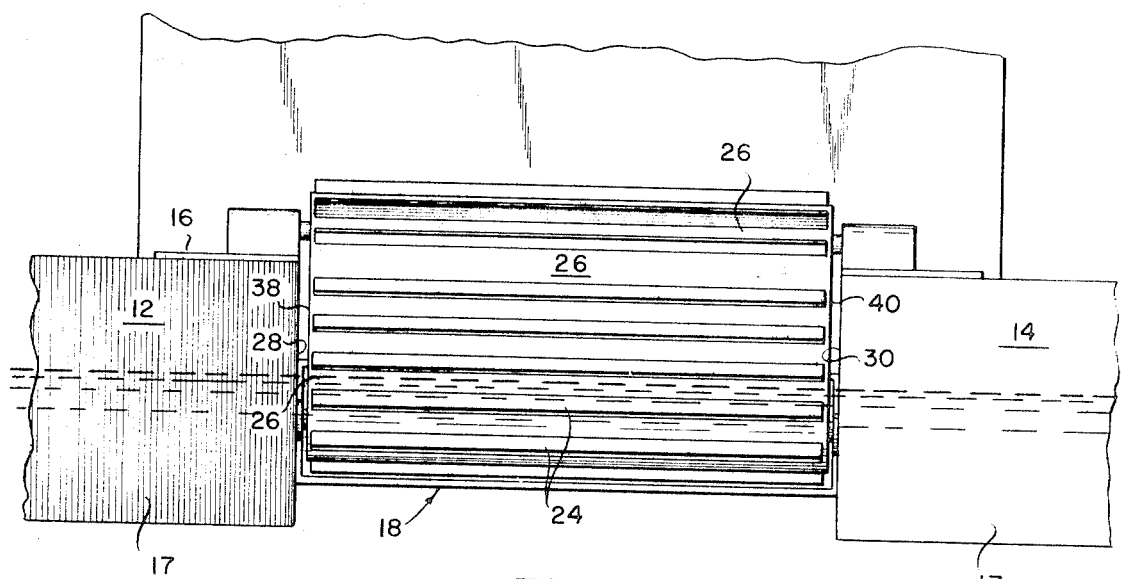
FIG. 2 is a front elevational view of the apparatus of FIG. 1.

Referring to FIG. 2, hulls 12 and 14 and skimmer 18 are shown with its marginal sides 38 and 40 almost contacting walls 28 and 30 of hulls 12 and 14, respectively. The purpose of having ends 38 and 40 close to the walls is to provide side guides whereby only a very small amount, if any, water or flotsam can escape conveyor pockets 26. Where necessary, such as in collecting oil, resilient skirts depending from walls 28 and 30 may rub against conveyor ends 38 and 40 to create another type of seal. While it is preferred to use the hulls of a catamaran-type vessel to channel flotsam to the skimmer apparatus, it will be apparent that other means such as floating ring members or the like may also be used for this purpose.

When the skimmer 18 is used with a catamaran or some other water vessel, the speed of the skimmer is made variable so that it will vary with the speed of the catamaran or other water vessel. When the speed of the skimmer and catamaran are adjusted and the skimmer's angle of inclination is set properly, maximum efficiency is obtained for the skimmer apparatus.

Figure 5:
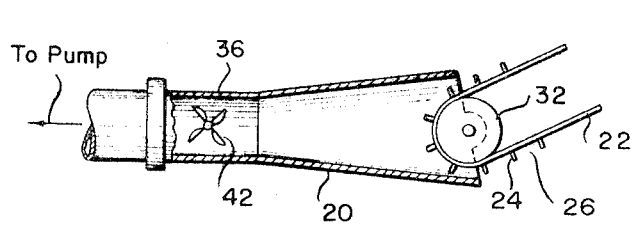
FIG. 5 is a fragmentary side elevational view illustrating a modified form of the present invention, and, FIG. 6 is a fragmentary plan view of a modified form of skimmer conveyor used with the present invention.

The present invention includes a modification wherein cutting means such as a chopper blade 42, FIG. 5, is placed within conduit 36 between the funnel 20 and the pump to reduce the size of the flotsam to a size where it is readily handled. Otherwise, large pieces of solid matter, such as branches, might damage the funnel or pump. The cutter blade 42 to be used may take any convenient form provided that it is compatible with the rest of the system. While it is convenient to dispose the cutting means within conduit 36, in order to shred the floating material, it will be apparent that the cutting means need not necessarily be within conduit 36.

Another modification of this invention comprises mounting the skimmer 18 on a floating platform (not shown) whereby flotsam is drawn into the skimmer by the rotation of the conveyor. The platform is anchored in an area which needs cleaning, and moves only after the area is cleaned. Such a practice is applicable in skimming the surface of small lakes and ponds around golf courses and the like. A further use of the skimmer apparatus is to harvest water plants and the like.

The method of operation of the present invention in a preferred form comprises mounting the skimmer on a float or water vessel and utilizing the difference in specific gravity between the water and the flotsam to trap the flotsam against the moving underwater surface of the skimmer, and thereafter collecting the flotsam underwater using a funnel and pump assembly to force the flotsam into a separation device or reservoir.

It is thought that the invention and many of its attendant advantages will be understood from the foregoing description, and it will be apparent that various changes may be made in the form, construction and arrangement of parts without departing from the spirit and scope of the invention, and the forms hereinbefore described being merely preferred embodiments thereof.

What is claimed is:

1. An apparatus for skimming flotsam from the surface of a body of water comprising:
   a. an endless conveyor belt means positioned at an inclined angle to the surface of the water, whereby one end of said conveyor belt means extends above the surface of the water and the other end of said conveyor belt means is positioned beneath the surface of the water,
   b. said conveyor belt means having a plurality of transversely extending fin members to define pockets between adjacent fin members,
   c. conduit means positioned beneath the surface of the water for receiving material trapped by said pockets,
   d. and pump means for advancing said material through said conduit means.

2. An apparatus for skimming flotsam as defined in claim 1 including side guide means for preventing the lateral escape of material entrapped by said pockets.

3. An apparatus for skimming flotsam as defined in claim 1 including means for channeling flotsam to said endless conveyor belt means.

4. An apparatus for skimming flotsam as defined in claim 3 wherein said means for channeling flotsam to said endless conveyor belt means consist of spaced hulls on a catamaran-type vessel.

5. An apparatus for skimming flotsam as defined in claim 2 wherein said side guide means consists of the sides of said spaced hulls on said catamaran-type vessel.

6. An apparatus for skimming flotsam as defined in claim 1 wherein said transversely extending fin members are substantially V-shaped.

7. An apparatus for skimming flotsam as defined in claim 1 including means for adjusting the angle of inclination that said conveyor belt means makes with the surface of the water in order to vary the rate at which flotsam is entrapped by said pockets.

8. An apparatus for skimming flotsam as defined in claim 1, including cutting means to shred material that has been trapped by said pockets of said endless conveyor belt means.

9. An apparatus for skimming flotsam as defined in claim 8 wherein said cutting means is mounted within said conduit means.

10. An apparatus for skimming flotsam as defined in claim 2 including means for adjusting the angle of inclination that said conveyor belt means makes with the surface of the water in order to vary the rate at which flotsam is entrapped by said pockets.

11. An apparatus for skimming flotsam as defined in claim 2 including cutting means to shred material that has been trapped by said pockets of said endless conveyor belt means.

12. An apparatus for skimming flotsam as defined in claim 11 wherein said cutting means is mounted within said conduit means.

13. A method of skimming flotsam from the surface of a body of water comprising the steps of
   a. directing flotsam toward and into pockets on a continuously rotating conveyor belt means,
   b. submerging said flotsam beneath the surface of the water in said pockets,
   c. transferring said flotsam while beneath the surface of the water from said pockets to a conduit means,
   d. and pumping said flotsam through said conduit means.

14. A method of skimming flotsam as defined in claim 13 including the additional step of separating flotsam from water that has become entrapped with said flotsam in said pockets.

15. A method of skimming flotsam as defined in claim 13 including the additional step of shredding said flotsam while in said conduit means.

* * * * *